United States Patent
Soliman et al.

(10) Patent No.: US 12,236,136 B2
(45) Date of Patent: Feb. 25, 2025

(54) PROCESSOR FOR PERFORMING A PREDETERMINED COMPUTATIONAL OPERATION, AND PROCESSING UNIT

(71) Applicant: Robert Bosch GmbH, Stuttgart (DE)

(72) Inventors: Taha Ibrahim Ibrahim Soliman, Renningen (DE); Tobias Kirchner, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 56 days.

(21) Appl. No.: 18/189,031

(22) Filed: Mar. 23, 2023

(65) Prior Publication Data

US 2023/0315341 A1    Oct. 5, 2023

(30) Foreign Application Priority Data

Apr. 1, 2022   (DE) ..................... 10 2022 203 284.5

(51) Int. Cl.
*G06F 3/06*           (2006.01)
(52) U.S. Cl.
CPC .......... *G06F 3/0659* (2013.01); *G06F 3/0614* (2013.01); *G06F 3/0656* (2013.01); *G06F 3/0683* (2013.01)
(58) Field of Classification Search
CPC .... G06F 3/0659; G06F 3/0614; G06F 3/0656; G06F 3/0683
See application file for complete search history.

(56) References Cited

U.S. PATENT DOCUMENTS

| | | | | |
|---|---|---|---|---|
| 6,952,756 | B1* | 10/2005 | Le | G06F 9/3842 365/219 |
| 11,126,550 | B1* | 9/2021 | Yeung | G06F 12/0802 |
| 2014/0198652 | A1 | 7/2014 | Dalal et al. | |
| 2017/0046158 | A1* | 2/2017 | Yen | G06F 9/383 |
| 2017/0060588 | A1 | 3/2017 | Choi | |
| 2020/0326949 | A1 | 10/2020 | Vo et al. | |
| 2020/0401529 | A1 | 12/2020 | Zhang et al. | |
| 2023/0004385 | A1* | 1/2023 | Kazakov | G06N 3/063 |
| 2023/0185761 | A1* | 6/2023 | Huang | G06N 3/063 |

* cited by examiner

*Primary Examiner* — Gurtej Bansal
(74) *Attorney, Agent, or Firm* — NORTON ROSE FULBRIGHT US LLP; Gerard A. Messina

(57) ABSTRACT

A processor for performing a predetermined computational operation in which one or multiple data element(s) is/are used to determine a result. The processor includes one or more processor core(s) and at least one buffer memory, connectable to a main memory, and if the main memory is connected, it is designed to access the main memory. Each processor core is designed to execute instructions. The at least one buffer memory includes a calculation circuit which is designed to perform the computational operation in response to an execution signal if the one or the multiple data element(s) is/are stored in the buffer memory, the result being stored in the buffer memory. The processor is designed to perform the computational operation optionally using one of the processor cores with the aid of the instructions or to perform it in the at least one buffer memory using the respective calculation circuit.

11 Claims, 2 Drawing Sheets

PROCESSOR FOR PERFORMING A PREDETERMINED COMPUTATIONAL OPERATION, AND PROCESSING UNIT

CROSS REFERENCE

The present application claims the benefit under 35 U.S.C. § 119 of German Patent Application No. DE 10 2022 203 284.5 filed on Apr. 1, 2022, which is expressly incorporated herein by reference in its entirety.

FIELD

The present invention relates to a processor for performing a predetermined computational operation, and to a processing unit.

BACKGROUND INFORMATION

For computationally intensive data processing methods or calculation methods, processors having multiple processor cores can be used. In heavily parallelizable calculation methods, it is especially possible to use what are known as streaming multiprocessors such as graphics processors. In most cases, these have a multitude of processor cores (also referred to as shaders) to achieve a high processing speed. A bottleneck may arise in a limited memory bandwidth, with the possible result that data required by the processor cores for the calculation method or data determined in the calculation method can be read out from the memory or stored in the memory only with a delay, which results in corresponding wait times for the processor cores.

SUMMARY

According to the present invention, a processor for performing a predetermined computational operation and a processing unit having such a processor are provided. Advantageous embodiments of the present invention are disclosed herein.

An example embodiment of the present invention utilizes the action of providing, in at least one buffer memory, a calculation circuit, which is designed to perform the predetermined computational operation in response to an execution signal if data elements (which are used in the computational operation) are stored in the buffer memory, the result being stored in the buffer memory (without the use of a processor core; the storing of the result may be considered to be part of the computational operation). In addition, the processor is designed to perform the computational operation optionally using a processor core with the aid of instructions or to perform it in the at least one buffer memory using the respective calculation circuit.

One advantage of the present invention may be that data traffic between the processor cores and the buffer memory can be avoided, which means that in particular latencies for the transmission of the data elements to a processor core and for the transmission of the result can be avoided. A further advantage is that—parallel to the performing of the computational operation in the buffer memory—other operations are able to be performed in the processor cores (provided a simultaneous access to the buffer memory is avoided). The optional performance of the computational operation in a processor core is advantageous if the data elements and/or the result is/are immediately required for a further operation in the processor core, so that they can stay in registers of the processor core, without access to the buffer memory.

In detail, according to an example embodiment of the present invention, the processor includes a multiplicity of processor cores and at least one buffer memory, is connectable to a main memory, and if the main memory is connected to the processor, it is designed to access the main memory (in a read and write manner including the buffer memory). Each processor core is designed to carry out instructions so that operations, the predetermined computational operation being among them, can be implemented with the aid of the instructions. In the predetermined computational operation, one or more data element(s) is/are used to determine a result.

The expression 'computational operation' denotes a general operation which is able to be performed by processor cores or corresponding specific circuits. In processor cores, such a computational operation can be implemented by one or more instruction(s). For example, instructions may be machine commands (instructions in machine language) or instructions of what is known as an 'instruction set architecture' (ISA). The latter are used in particular in streaming multiprocessors such as graphics processors. Computational operations may be elementary operations such as arithmetic operations (e.g., addition, multiplication, . . . ), bit-shift operations (i.e., shift operations of bits of a data element), copy operations (e.g., a data element is copied to a further memory location), or similar actions. Combinations of such elementary operations are also considered computational operations, e.g., the multiplication of two data elements and the addition of the product to a continuous summand (accumulator) (multiply-accumulate, MAC), $a \leftarrow a+(b \cdot c)$.

Here, the term 'optionally' may describe that the processor is designed to interpret corresponding instructions and to implement them. Accordingly, an ISA (instruction set architecture) is able to be expanded or modified. In a normal ISA, a typical MAC computational operation can be implemented with the aid of instructions that are to be executed by a processor core, e.g., in the following manner:

mov.u16 %rh1, %ctaid.x;
    mov.u16 %rh2, %ntid.x;
    mul.wide.u16 %r3, %rh1, %rh2;
    add.u32 %r4, %r4, %r3;
    st.global.f32 [%result.x], %r4;

In an expanded ISA, the MAC computational operation could be implemented by a single instruction that triggers the calculation in the buffer memory:

Pim.mac.u16 %result.x, %ctaid.x, %ntid.x;

In this example, the operation is basically executed across a memory area. To this end, at least 2 memory locations are multiplied with one another at least twice in each case and these results of the multiplication of two memory cells are summed to calculate the result of the MAC computational operation. This is carried out in parallel in hardware. There is no continuous summand as in a sequential process.

The prefix "Pim" (Processing-in-memory) characterizes instructions (Pim instructions) to be executed in the buffer memory. In other words, the processor could perform the computational operation in a processor core with the aid of the above instructions or in the buffer memory with the aid of the calculation circuit using the Pim instruction.

The calculation circuit is a circuit which is situated in the buffer memory or disposed together with a memory latch of the buffer memory. It is designed to read the data elements out of the buffer memory, to perform the calculation, and to store the result in the buffer memory. This takes place especially in response to an instruction (execution signal), e.g., from a corresponding control unit of the processor. The instruction particularly also includes memory addresses which relate to the data elements and the result, that is, memory addresses at which the data elements are located, and memory addresses to which the result is to be written. The result may include one or more data element(s).

As an alternative or in addition, the calculation by the calculation circuit may take place automatically in response to a write access of one of the data elements and/or automatically in response to a read access to the result. In other words, the calculation is triggered in response to a write access to at least one of the memory addresses where the data elements are stored, or in response to a read access to memory addresses where the result is to be stored. Write/read accesses may thus be considered execution signals.

According to an example embodiment of the present invention, when the calculation circuit is used, the data elements remain in the buffer memory without being loaded into a processor core such as an ALU (arithmetic logic unit) of a processor core. In a MAC operation performed by a processor core, for instance, a new operand is always loaded again from the memory into the ALU and processed. If a calculation circuit is used in the buffer memory (that is, during 'in-memory computing'), the data remain in the memory. At the same time, the one computational operation is computationally processed by the calculation circuit, i.e., by a hardware, without any involvement of the ALU, e.g., in the manner of a MAC operation.

The exemplary embodiment of the present invention preferably includes an instruction and/or a write access to one or more of the data element(s) and/or a read access to the result. An instruction may also include memory addresses for the data elements and the result, for instance. If the execution signal is a write access of (at least) one of the data elements or a read access to the result, then the execution of the computational operation automatically takes place in the calculation circuit, without a separate instruction. In this case, the memory addresses for the data elements and the result may be fixedly specified in the calculation circuit (in the sense of hardware-specified) or, put another way, predetermined memory addresses in the buffer memory are assigned to the calculation circuit, or registers may be provided in the calculation circuit which can be initialized using the memory addresses.

If at least one of the required data elements is not already stored in the buffer memory (cache-miss), then it will first be loaded into the buffer memory, e.g., from the main memory or, given multiple hierarchically organized buffer memories, from another buffer memory (such as from a level 2 cache to the level 1 cache). This is accomplished with the aid of an administration module of the buffer memory generally known as such by a person of ordinary skill in the art, which is included in the processor, typically implemented as hardware, and which implements a suitable buffer memory strategy.

Accordingly, if the computational operation is to be performed in the at least one buffer memory, the processor is preferably designed to determine whether the one or the multiple data element(s) is/are in the at least one buffer memory, and if the one or the plurality of data element(s) is/are not (yet) stored in the at least one buffer memory, to load the one or the multiple data element(s) into the at least one buffer memory and to store them there. The loading (or the reading and storing) may take place from the main memory or from another buffer memory, e.g., from the level 2 cache to a level 1 cache.

If the computational operation is to be carried out in the at least one buffer memory, the processor is preferably designed to write the one or the multiple data element(s) to predetermined memory addresses or to memory addresses defined by initializable registers in the at least one buffer memory. This embodiment is advantageous especially if the computational operation takes place automatically, that is, when the execution signal is a write access of (at least) one of the data elements or a read access to the result.

According to an example embodiment of the present invention, the decision whether the computational operation will be carried out using one of the processor cores or be performed in the at least one buffer memory is preferably made based on an expected reusability degree of the one or the multiple data element(s) and/or the result. The expression 'reusability degree' basically describes a probability that a data element and/or a result will be required, i.e., reused, in subsequent operations. The reusability degree, for example, may be directly given as a probability or also as a time span (such as given in clock cycles of the processor) or an inverse of the time span until a data element and/or result is/are used again (generally in an operation other than the computational operation). The reusability degree is able to be determined by an analysis of operations in a task that includes the computational operation, for instance. It is also possible to determine the reusability degree by a statistical analysis while one or more tasks that include the computational operation are running.

The expected reusability degree particularly relates to operations within a task. The term 'task' is meant to describe a self-contained part of a computer program or an entire computer program. As a rule, a task includes multiple operations, that is, apart from the computational operation, also further operations or other computational operations. The computational operation itself may naturally also occur multiple times within a task.

In addition, the at least one buffer memory is preferably selected to perform the computational operation if the expected reusability degree lies within a predetermined range. In this way, the tasks that include computational operations and use certain data elements/results are able to be selectively chosen for the execution in the buffer memory.

The at least one buffer memory preferably has multiple first buffer memories and a second buffer memory, each first buffer memory being assigned to one of the processor cores or to a subset of the processor cores, and the second buffer memory being assigned to all processor cores, and if the computational operation is to be performed in the at least one buffer memory, the processor is furthermore designed to perform the computational operation optionally in one of the first buffer memories or in the second buffer memory. The first buffer memories may be considered a (relatively small) level 1 cache, and the second buffer memory can be considered a level 2 cache. Thus, a hierarchical buffer memory design as it is used in streaming multiprocessors is involved. Overall, the processor is able to perform the computational operation using the processor cores, a first buffer memory or the second buffer memory.

The choice whether the computational operation is to be performed in one of the first buffer memories or in the second buffer memory is preferably made on the basis of an, or the, expected reusability degree of the one or the multiple data element(s) and/or the result. Furthermore, one of the first buffer memories is preferably selected to perform the computational operation if the expected reusability degree lies above a predetermined first threshold, and/or the second buffer memory is selected to perform the computational operation if the expected reusability degree lies below the predetermined first threshold or is equal to the predetermined first threshold. In an advantageous manner, the computational operation is performed in the first buffer memory if the data elements or the results are directly reused again, that is, have a high reusability degree, because they remain close to the processor core(s) assigned to the first buffer memory in this way and thus are able to be loaded into one of these processor cores with a low latency. Given a lower reusability degree, the second buffer memory is expediently used, which may lead to a reduction in the data traffic and to fewer cache misses.

A processing unit of an example embodiment of the present invention includes a processor according to the present invention and a main memory connected thereto, the main memory including a calculation circuit, which is designed to perform the computational operation in response to an execution signal if the one or the multiple data element(s) is/are stored in the main memory, the result being stored in the main memory, and the processor furthermore being designed to optionally induce the main memory to perform the computational operation using the calculation circuit of the main memory. Thus, it is possible to perform the computational operation in the main memory so that a data transfer between the main memory and the processor can be avoided. As in the at least one buffer memory, the execution signal (for the main memory) is preferably an instruction and/or a write access to one (or multiple) data element(s) and/or a read access to the result.

The decision whether the main memory is to be induced to perform the computational operation is preferably made on the basis of an, or the, expected reusability degree of the one or the multiple data element(s) and/or the result. Moreover, the main memory is preferably induced to perform the computational operation if the reusability degree lies below a predetermined second threshold. For practical purposes, the computational operation is therefore performed in the main memory if it is highly unlikely or practically excluded that the data elements and/or the result will be reused again in an operation or that they are reused again within an expected time period after which they are deleted from the buffer memory in accordance with the buffer memory strategy.

The second threshold, the above-described first threshold, and the also above-described range for the reusability degree are able to be selected appropriately. The precise specification depends on the definition of the reusability degree and is able to be appropriately selected by one skilled in the art.

Additional advantages and embodiments of the present invention result from the description and the figures.

The present invention is schematically illustrated in the figures based on exemplary embodiments and will be described in the following text with reference to the figures.

DETAILED DESCRIPTION OF EXAMPLE EMBODIMENTS

Figure 1:
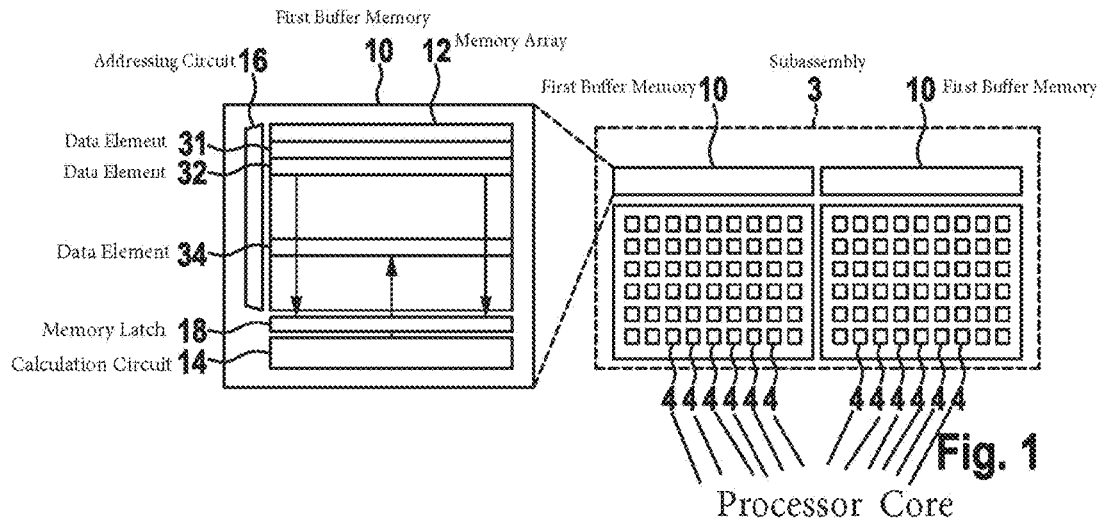
FIG. 1 shows a subassembly of a processor according to a preferred example embodiment of the present invention.

FIG. 1 shows a subassembly 3 of a processor according to a preferred embodiment. Multiple processor cores 4 are disposed in, for example, two (processor core) groups in subassembly 3 according to a preferred embodiment. A first buffer memory 10 (such as a level 1 cache) is assigned to each group. In general, each group may include one or more processor core(s). First buffer memory 10 is used for the buffer storage of data that are transferred between the processor cores and a main memory or a further buffer memory (not shown in FIG. 1).

A schema of a first buffer memory 10 is shown in an enlarged view on the left in FIG. 1. First buffer memory 10 includes a memory array 12, that is, a series of memory cells (e.g., SRAM cells; SRAM: Static Random Access Memory). With the aid of an addressing circuit 16, data elements 31, 32, 34 stored in memory array 12 are able to be addressed so that a (read and write) access to them is possible. A memory latch 18 is used to briefly store the data elements or their bits while memory accesses to memory array 12 take place, so that they are able to be read out with the aid of the memory latch, or the content of the memory latch can be transmitted to the memory cells (relating to the data element addressed by addressing circuit 16 in each case).

First buffer memory 10 has a calculation circuit 14 (or buffer memory calculation circuit, or first buffer memory calculation circuit). Calculation circuit 14 is designed to perform a certain computational operation such as the above-mentioned MAC operation for data elements stored in memory array 12 of first buffer memory 10, and to store the result of the computational operation as a data element in memory array 12. In the illustrated example, the computational operation or calculation circuit 14 which implements the computational operation, determines a result, which is stored as a data element 34 in memory array 16, from two operands that are stored as data elements 31, 32 in memory array 16. In the example of the MAC operation, the end result of the summation is stored as the result, and no buffer storing/loading of intermediate results of a running total or similar operation takes place. The computational operation is performed by calculation circuit 14 of first buffer memory 10 without any involvement of processor cores 4. A transfer of the data elements into one of the processor cores and a transfer of the result back to the first buffer memory are therefore omitted, which means that delays caused by the data transfer can be avoided. The computational operation is performed by the calculation circuit in response to a corresponding instruction or, more generally, in response to an execution signal.

Figure 2:
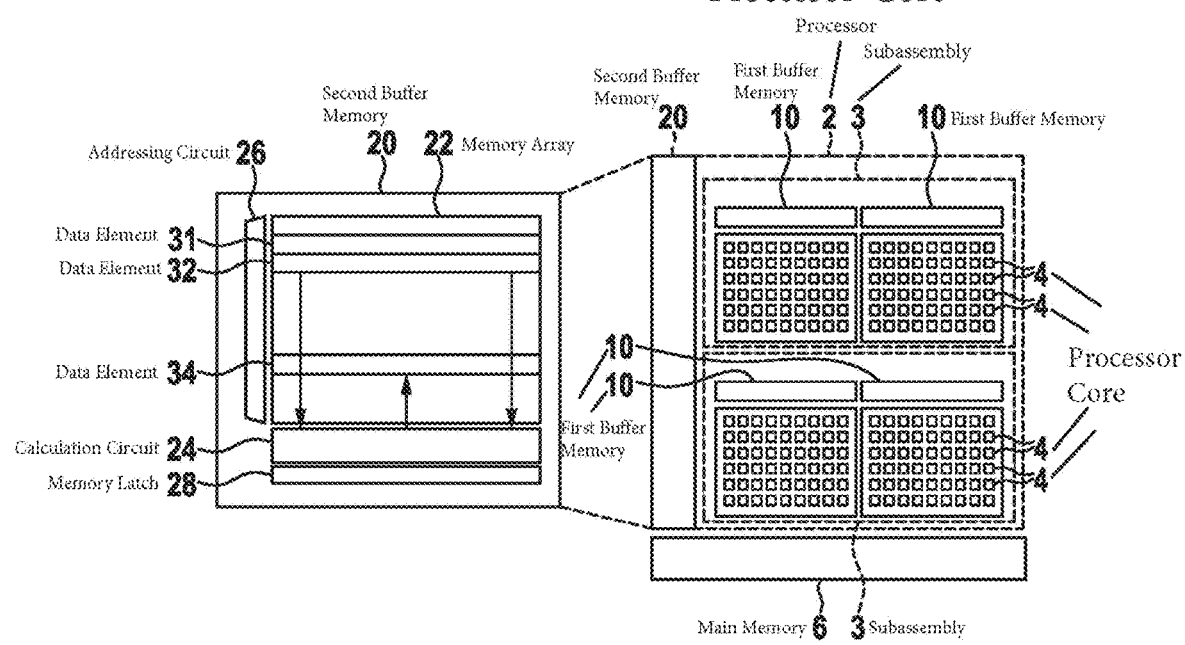
FIG. 2 shows a processor, which is connected to a main memory, according to a preferred example embodiment of the present invention.

FIG. 2 shows a processor 2, which is connected to a main memory 6 for a data transmission, according to a preferred embodiment. Main memory 6, for example, may be a DRAM memory (DRAM: Dynamic Random Access Memory). Processor 2 is able to read data elements from main memory 6 and to store them in main memory 6. As a rule, the main memory has a considerably greater storage capacity than buffer memories included by the processor, whereas the processor cores have much faster access to the buffer memories.

Processor 2 includes a plurality of subassemblies 3 (two, by way of example, but the number may also differ), which may be designed according to the embodiment illustrated in FIG. 1, so that their design will not be described again. In a deviation from the embodiment shown in FIG. 1 (which is optional, however), it may be provided that first buffer memories 10 do not include a calculation circuit 14.

Processor 2 additionally includes a second buffer memory 20 (shown in an enlarged view in FIG. 2 as a schema on the left), which is assigned to all subassemblies 3 or all processor cores 4. Using the first and second buffer memories, data stored in main memory 6 are typically transferred to processor cores 4 and from there are transferred back to main memory 6, for which appropriate buffer memory strategies are used.

Second buffer memory 20 (e.g., a level 2 cache) has a similar development to first buffer memory 10, and thus includes a memory array 22 (a system of memory cells, e.g., SRAM cells), an addressing circuit 26 by which data elements 31, 32, 34 stored in memory array 12 are able to be addressed, so that a (read and write) access to them is possible, and a memory latch 28, which is used to briefly store the data elements or their bits while memory accesses to memory array 22 take place, so that they can be read out with the aid of the memory latch or the content of the memory latch be transmitted to the memory cells.

Second buffer memory 20 includes a calculation circuit 24 (second buffer memory calculation circuit). Calculation circuit 24 is designed to perform the particular computational operation such as the above-mentioned MAC operation for data elements stored in memory array 22 of second buffer memory 20 and to store the result of the computational operation as a data element in memory array 22. In the illustrated example, the computational operation, or calculation circuit 24 which implements the computational operation, determines a result from two operands that are stored as data elements 31, 32 in memory array 26, the result being stored as a data element 34 in memory array 26. The computational operation is carried out by calculation circuit 24 of second buffer memory 20 without any involvement of processor cores 4 (or of the first buffer memory). A transfer of the data elements to one of the processor cores, which would additionally run via first buffer memory 10, is therefore omitted.

Figure 3:
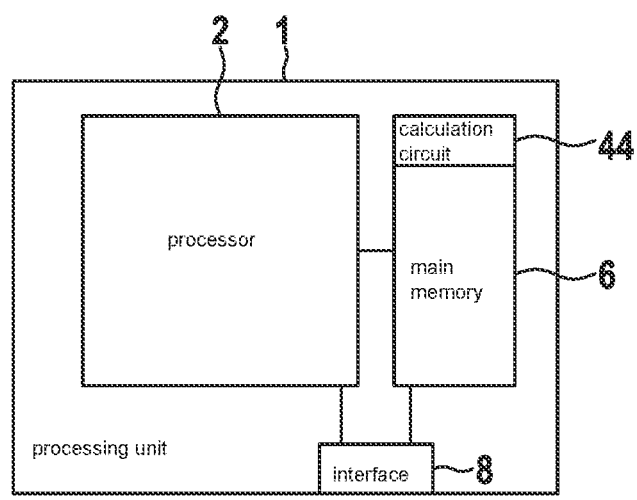
FIG. 3 shows a processing unit according to a preferred example embodiment of the present invention.

FIG. 3 shows a processing unit 1 according to a preferred embodiment. Processing unit 1 has a processor 2 (for instance according to the embodiments of FIG. 1 or 2), and a main memory 6 which is connected thereto. In addition, an optional interface 8, which may be provided for a data communication of processing unit 1 with other processing units, is provided. Interface 8 is connected to processor 2 by way of example and preferably connected to main memory 6 for a data communication.

As also first and/or second buffer memory 10, 20, main memory 6 preferably includes a calculation circuit 44 (main memory calculation circuit), which is designed to execute the particular computational operation for data elements stored in main memory 6 and to store the result of the computational operation as a data element in main memory 6.

What is claimed is:

1. A processor configured to perform a predetermined computational operation in which one or more data elements is used to determine a result, the processor comprising:
   one or more processor cores;
   at least one buffer memory;
   wherein the processor is connectable to a main memory, and being configured to access the main memory if the main memory is connected, each processor core being configured to execute instructions;
   wherein the at least one buffer memory includes a calculation circuit configured to execute the computational operation in response to an execution signal if the one or the multiple data elements is stored in the buffer memory, the result being stored in the at least one buffer memory; and
   wherein the processor is configured to perform the computational operation optionally using one of the processor cores using instructions or in the at least one buffer memory using the calculation circuit, wherein a decision whether the computational operation is performed using one of the processor cores or in the at least one buffer memory is based on an expected reusability degree of the one or more data elements and/or of the result.

2. The processor as recited in claim 1, wherein the execution signal is an instruction and/or a write access to one of the data elements and/or a read access to the result.

3. The processor as recited in claim 1, wherein the processor is configured to select the at least one buffer memory to perform the computational operation if the expected reusability degree lies within a predetermined range.

4. The processor as recited in claim 1, wherein:
   the at least one buffer memory includes multiple first buffer memories and a second buffer memory, each of the first buffer memories being assigned to one of the processor cores or to a subset of the processor cores, and the second buffer memory being assigned to all processor cores; and
   the processor being configured to, if the computational operation is to be performed in the at least one buffer memory, perform the computational operation optionally in one of the first buffer memories or in the second buffer memory.

5. The processor as recited in claim 4, wherein the processor is configured to make a decision whether the computational operation is to be performed using one of the first buffer memories or in the second buffer memory based on an expected reusability degree of the one or more data elements and/or of the result.

6. The processor as recited in claim 1, wherein the processor is configured to determine, if the computational operation is to be performed in the at least one buffer memory, whether the one or more data elements is in the at least one buffer memory, and if the one or the multiple data elements is not stored in the at least one buffer memory, to load or store the one or more data elements into or in the at least one buffer memory.

7. The processor as recited in claim 1, wherein the processor is configured to, if the computational operation is to be performed in the at least one buffer memory, write the one or more data elements to predetermined memory addresses or to memory addresses, determined by initializable registers, in the at least one buffer memory.

8. A processor configured to perform a predetermined computational operation in which one or more data elements is used to determine a result, the processor comprising:
   one or more processor cores;
   at least one buffer memory;
   wherein the processor is connectable to a main memory, and being configured to access the main memory if the main memory is connected, each processor core being configured to execute instructions;
   wherein the at least one buffer memory includes a calculation circuit configured to execute the computational operation in response to an execution signal if the one or the multiple data elements is stored in the buffer memory, the result being stored in the at least one buffer memory; and
   wherein the processor is configured to perform the computational operation optionally using one of the processor cores using instructions or in the at least one buffer memory using the calculation circuit, wherein:
   the at least one buffer memory includes multiple first buffer memories and a second buffer memory, each of the first buffer memories being assigned to one of the processor cores or to a subset of the processor cores, and the second buffer memory being assigned to all processor cores;

the processor being configured to, if the computational operation is to be performed in the at least one buffer memory, perform the computational operation optionally in one of the first buffer memories or in the second buffer memory;

the processor is configured to make a decision whether the computational operation is to be performed using one of the first buffer memories or in the second buffer memory based on an expected reusability degree of the one or more data elements and/or of the result; and the processor is configured to select the one of the first buffer memories to perform the computational operation if the expected reusability degree lies above a predetermined first threshold, and/or to select the second buffer memory to perform the computational operation if the expected reusability degree lies below the predetermined first threshold or is equal to the predetermined first threshold.

9. A processing unit, comprising:

a processor configured to perform a predetermined computational operation in which one or more data elements is used to determine a result, the processor including:

one or more processor cores, at least one buffer memory, wherein the processor is connectable to a main memory, and being configured to access the main memory if the main memory is connected, each processor core being configured to execute instructions, wherein the at least one buffer memory includes a first calculation circuit configured to execute the computational operation in response to a first execution signal if the one or the multiple data elements is stored in the buffer memory, the result being stored in the at least one buffer memory, and wherein the processor is configured to perform the computational operation optionally using one of the processor cores using instructions or in the at least one buffer memory using the calculation circuit of the at least one buffer memory; and the main memory connected to the processor, the main memory including a second calculation circuit, which is configured to perform the computational operation in response to a second execution signal if the one or more data elements is stored in the main memory, the result being stored in the main memory;

wherein the processor is configured to optionally induce the main memory to perform the computational operation using the second calculation circuit of the main memory.

10. The processing unit as recited in claim 9, wherein the processor is configured to make a decision whether the main memory is to be induced to perform the computational operation based on an expected reusability degree of the one or more data elements and/or of the result.

11. The processing unit as recited in claim 10, wherein the processor is configured to induce the main memory to perform the computational operation if the reusability degree lies below a predetermined second threshold.

* * * * *